_United States Patent Office_ 3,466,641
Patented Sept. 9, 1969

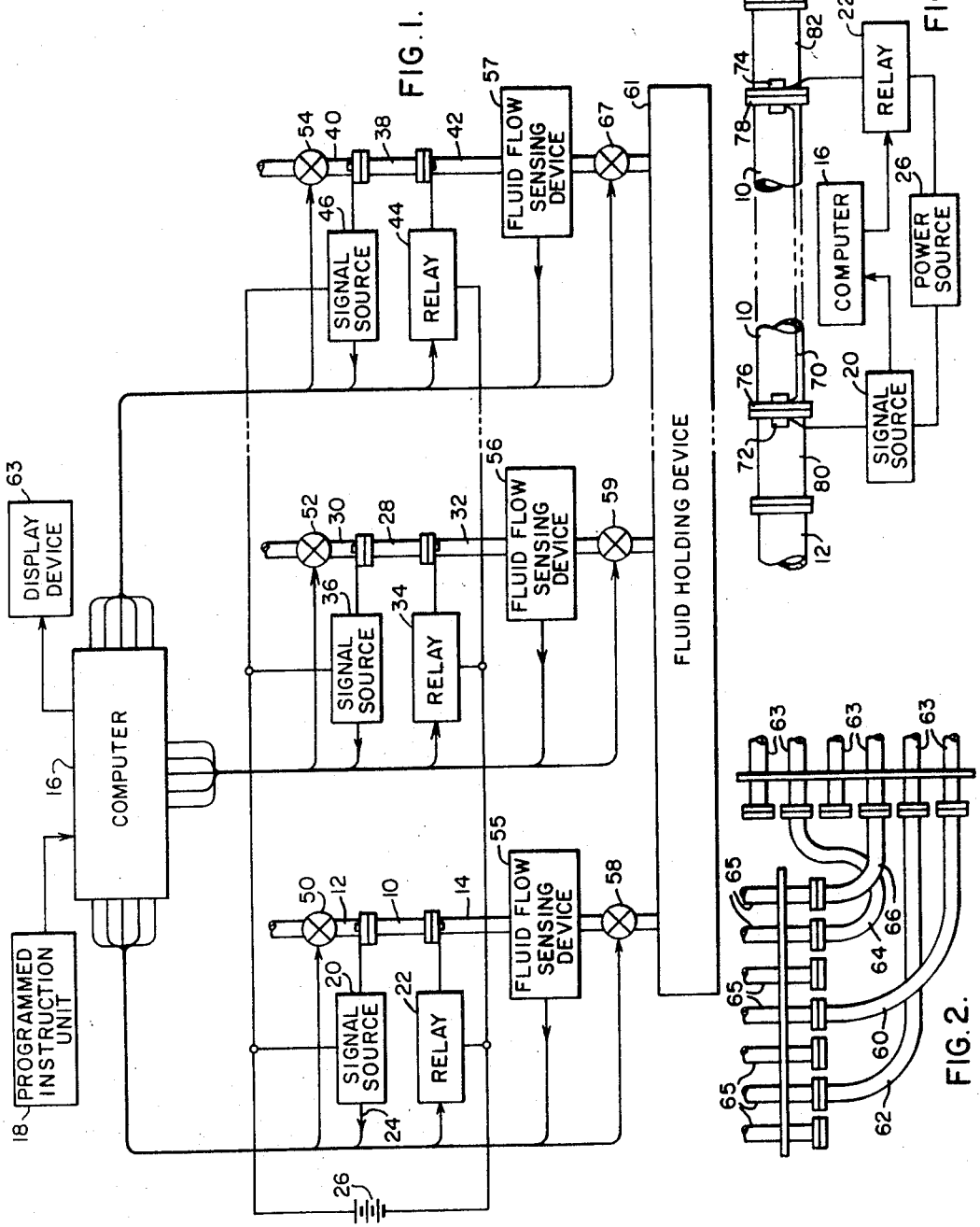

3,466,641
FLUID TRANSFER CONTROL APPARATUS
Richard E. J. Putman, Pittsburgh, Pa., assignor to Westinghouse Electric Corporation, Pittsburgh, Pa., a corporation of Pennsylvania
Filed Nov. 10, 1966, Ser. No. 593,435
Int. Cl. G05b *11/01, 19/26, 23/02*
U.S. Cl. 340—222        5 Claims

ABSTRACT OF THE DISCLOSURE

There is disclosed a control apparatus for the transfer of fluids or other suitable materials through one or more coupling members, which includes an electrically conductive circuit for each such coupling member, such that respective monitoring signals can be provided through said circuits to determine when the associated coupling members are properly positioned. A programmed computer is operative to determine when all of the transfer couplings are completed as desired and to control the subsequent transfer operation in accordance with the programmed instructions for the desired transfer operation.

---

The present invention relates in general to fluid transfer control apparatus adapted for connection between a first fluid container unit and a second fluid container unit, and more particularly to such control apparatus which provides an indication of completed interconnections between such container units and is suitable for automatic control of the actual fluid transfer operation between the first and second fluid container units as would be desirable during a fluid blending operation involving a plurality of different fluids.

It has been required in accordance with the teachings of the prior art to check manually or in some other individually sensed manner the actual coupling connections made between the respective fluid holding units or containers in preparation for a fluid blending operation involving a plurality of different fluids.

It is an object of the present invention to provide an improved control system for a fluid transfer apparatus, such as the liquid blending system, wherein the desired interconnections between a multiplicity of fluid holding units or tanks made in a predetermined manner are better sensed for correctness of interconnection to assure proper fluid transfer as desired and to facilitate the maintaining of blending specifications and proper inventories.

It is an additional object to facilitate the control of a fluid transfer system by an automatic control apparatus, which can incorporate a high speed digital computer, which automatically checks the continuity of provided electrical circuits resulting from the desired interconnections between the respective fluid container units involved in the particular fluid transfer operation to be controlled.

In accordance with the present invention electrical circuits are associated with the fluid coupling connections established in a predetermined manner between the respective fluid container or holding units and through which fluid is to be transferred, which circuits are continuity checked by a monitor control apparatus that could include a high speed digital computer for sensing the completed fluid transfer coupling connections. The computer also compares these with programmed instructions for the desired connections, and the control apparatus is then made operative to control the fluid transfer operation as desired.

Further objects, features and advantages of the present invention will become apparent with reference to the following specification and drawing in which:

FIG. 1 is a diagrammatic showing of the control apparatus in accordance with the present invention;
FIG. 2 is an illustrative showing of the fluid transfer interconnections to be provided; and
FIG. 3 shows in greater detail a modified teaching of the present invention.

In FIG. 1 there is shown a first fluid transfer coupling 10 connected between a first fluid container or a source 12 of fluid to be transferred and a second fluid container or receiving unit 14 for that fluid. It should be understood that suitable fluid container tanks or the like are included as required for this purpose. A computer 16 is operative with the programmed instruction unit 18 for sequentially energizing a signal source 20 to provide a control signal in conjunction with the electrically conductive fluid transfer coupling 10, which can include a separate insulated conductor for the signal path, when a circuit is completed through operation of a relay 22 which is closed upon receipt of a control signal from the computer 16. In this manner, the computer sequentially closes the relay 22 to cause an electrical current to flow through the conductive circuit associated with the fluid transfer coupling 10 and cause the signal source 20 to provide a control signal through the conductor 24 to the computer 16. The power source 26 energizes the current path which is so established.

Similarly a second fluid transfer coupling 28 is connected between a source 30 of fluid to be transferred and a receiver 32 for the fluid so transferred. The computer 16 sequentially energizes the relay 34 to complete an electrical circuit for current from the power source 26 to flow through and cause the signal source 36 to thereby provide a suitable control signal to the computer 16.

A third such fluid transfer coupling 38 is shown connected between a source 40 of fluid to be transferred and a receiver 42 for said fluid. When the computer energizes the relay 44, a current signal is caused to flow through the fluid transfer coupling 38 and cause the signal source 46 to provide a control signal to the computer 16 indicating that the electrically conductive fluid transfer coupling 38 is in fact interconnected between the source of fluid to be transferred and the receiver 32 for that fluid.

The computer 16 upon receipt of the control signal from the signal source 20 can when desired provide a control signal to the valve 50 to cause the fluid to be transferred through the fluid transfer coupling 10. Similarly, the valve 52 and the valve 54 are controlled by appropriate control signals from the computer 16 when it is desired that they open to permit the passage of their respective fluids.

Additionally in FIG. 1 there are shown fluid flow sensing devices 55, 56 and 57 operative with the respective fluid transfer couplings to provide to the computer 16 appropriate signals in accordance with the respective fluid flows through the fluid transfer couplings 10, 28 and 38. A flow control valve 58 is then adjusted by a signal from the computer 16 to determine the actual flow of component fluid through the fluid transfer coupling 10 as desired for the programmed and predetermined blend recipe of all the transferred fluids. Similarly, the flow control valve 59 is adjusted by a signal from the computer 16 to determine the actual flow of its particular component fluid through the fluid transfer coupling 28, and the flow control valve 60 is adjusted by a signal from the computer 16 to determine the actual flow of its particular component fluid through the fluid transfer coupling 38 as desired. A blended fluid holding device 61, such as a container tank or the like, is operative to receive the fluids transferred through all the provided number of fluid transfer couplings.

Through the programmed operation of the computer 16, it can be operative with a provided display device 63 to give visual or other suitable indications or directives to a workman assigned the task of physically positioning the fluid transfer couplings into their desired respective connections to permit the inflow of the desired component fluids into the fluid holding device 61. For example, the workman could be so informed to insert the fluid transfer coupling 10 into position between the designated first fluid source 12 and the fluid receiver 14 as the desired connection out of many that could possibly be made. Upon the computer 16 becoming aware that the proper connection has been completed, the computer 16 in conjunction with the display device 63 would then give an indication of the desired next connection to be completed by the workmen with regard to the fluid transfer coupling 28 and so forth for the rest of such couplings that are involved. Upon all of the desired coupling being properly connected, the computer 16 would initiate the desired flows of the respective fluids and control the amounts of those fluid flows in accordance with programmed instructions from the unit 18 and determined by the desired blending recipe for the resultant blend of all the transferred fluids.

In FIG. 2 there are shown several of these electrically conductive fluid transfer couplings 60, 62, 64 and 66. To those persons already familiar with the technique of liquid blending systems, where a multiplicity of fluid holding tanks is to be connected to a selected number of blending stations by means of coupling hoses, the provision of such fluid transfer couplings is well known. For the automation of such liquid blending systems it is desirable to be to be able to check readily that the fluid transfer coupling hoses have been coupled correctly between the desired terminal points in order to insure the fluid blending is proceeding according to a desired recipe and that proper control of tank inventories are maintained.

In FIG. 3 there is shown a suitable fluid transfer coupling, such as coupling 10 shown in FIGURE 1, with an electrical conductor 70 made integral with the fluid transfer coupling 10 so that the conductor 70 of the coupling itself thereby forms part of an electrical circuit, the continuity of which can be monitored by the computer 16. For the application with an electrically conductive fluid transfer coupling, a separate conductor may not be required. The electrical circuit so provided can be direct current or alternating current as may be desired. In the case of a direct current circuit as shown in FIGURE 3 simple contacts 72 and 74 are made between the respective ends of the fluid transfer coupling 10 for establishing an otherwise isolated electrical circuit for the flow of a direct current to be sensed by the signal source 20 to indicate that the electrical circuit so formed is in fact complete. For an alternating current application, coupling transformers can be provided in association with the respective flanges 76 and 78 of the fluid transfer couplingg 10 for the completion of the sensing current circuit. Insulated spool pieces 80 and 82 assure isolation of the provided electrical circuit.

It is readily apparent that a large number of combinations in the arrangement of fluid transfer couplings as shown in FIG. 2 may be provided and it is not unusual to have a total of 20 terminal points 63 on the blending station and in the order of 150 supply pipes 65 coming from the fluid holding tank farm. A separate contact closure outlet will be provided in the computer to drive its own selector relay, such as relay 22 shown in FIG. 1, which will complete the circuit from the power supply 26 through one of the transfer couplings. The pipes 65 coming from the tank farm from which fluid is desired will each be connected to a contact closure input on the computer such that an electrical circuit between the power supply 26 and the corresponding contact closure input will be completed through the coupling hose circuit itself by virtue of the electrical conductor integral within the fluid transfer coupling hose and the associated signal source 20. The computer 16 will have been instructed as to which terminal points should be connected together by the fluid transfer coupling hoses. Upon receipt of the appropriate command, the computer will close the contact closure outputs in sequence and simultaneously check which contact closure inputs are thereby energized. In this way the computer will check the terminal designations against those required as set forth in its program instructions to achieve the desired recipe and print out in accordance with desired ratios and quantities of the various constituent fluids or other materials. An alarm can indicate any discrepancy that might occur.

Insulated spool pieces 80 and 82 have been indicated in FIG. 3 since it is preferred that the ends of the fluid transfer coupling hoses be insulated from their surrounding in order that only one electrical circuit path is made available for provision of the control signal provided by the proper connection of the fluid transfer coupling hose.

It should be understood that the teachings of the present invention includes the direct operation of the computer 16 to provide a sensing signal to determine the completeness of each electrical circuit formed by the desired physical connections of the respective fluid transfer couplings. In this latter operation of the computer, it would provide directly a control signal to sense sequentially if each electrical circuit is properly completed between the desired fluid source and the desired fluid receiver unit, and if the circuit and its associated fluid transfer coupling is properly connected, the computer 16 is operative to sense the completion of each electrical circuit. This makes unnecessary the signal source and associated relay for each fluid transfer coupling.

The fluid flow sensing devices 55, 56 and 57 can provide pulses in accordance with their respective actual flow rates, which pulses can be counted to determine when the desired total flow of each component fluid has been received.

Various modifications of the present invention may be made within the scope and spirit of the present teachings.

I claim as my invention:

1. In control apparatus for the transfer of fluid from at least one first fluid container to at least one second fluid container, the combination of electrically conducting fluid transfer coupling means connected between said first and second fluid containers, signal means operative with each coupling means and connected to provide a control signal when each predetermined connection of said coupling means is effected, fluid flow control means cooperative with each of said connections to control the flow of fluid through each of said connections, and operation control means responsive to each of said control signals and operative with said flow control means to permit the desired transfer of fluid from each of said first fluid containers to each of said second fluid containers in response to each of said control signals.

2. The control apparatus of claim 1 operative with a plurality of first fluid containers and a plurality of second fluid containers, including electrically conductive fluid transfer coupling means connected between selected ones of said first fluid containers and selected ones of said second fluid containers to provide a predetermined arrangement of actual fluid transfer couplings from said first fluid containers to said second fluid containers, with said operation control means including a computer responsive to an instruction program and operative for comparing said predetermined arrangement of actual fluid transfer couplings with a provided instruction program of desired couplings before permitting the actual transfer of fluid through said actual fluid transfer couplings.

3. The control apparatus of claim 1, with said signal means including a circuit completing means for providing an electrical circuit through said fluid transfer coupling means upon receipt of an energizing signal, and with said operation control means periodically providing said energizing signal for completion of said electrical circuit to provide said control signal whenever said electrical circuit is so provided.

4. The control apparatus for the passage of a material through a transfer coupling member, the combination of circuit means operative with said coupling member for completing an electrical circuit when said coupling member is ready for the passage of said material, signal means connected to said circuit means for providing a control signal when suitably energized and said electrical circuit is completed, passage control means cooperative with said coupling member for controlling the passage of said material, and operation control means connected to periodically energize said signal means and responsive to said control signal for causing said passage control means to permit the passage of said material through said coupling member upon the receipt of said control signal.

5. The control apparatus of claim 4 operative with a plurality of transfer coupling members, with said operation control means sequentially energizing the signal means for each of said coupling members and responsive to the respective control signals provided when each of said coupling members is ready for the passage of its respective material, said operation control means then causing the respective passage control means to permit the passage of said materials through said coupling members upon receipt of the respective control signals.

References Cited

UNITED STATES PATENTS

| | | | |
|---|---|---|---|
| 3,088,315 | 5/1963 | Withers | 235—151.34 X |
| 3,219,046 | 11/1965 | Waugh | 235—151.34 |
| 3,259,141 | 7/1966 | Brenoon. | |
| 3,299,258 | 1/1967 | Borsboom et al. | 235—151.34 |
| 3,333,468 | 8/1967 | Jacobs. | |

MALCOLM A. MORRISON, Primary Examiner

JOSEPH F. RUGGIERO, Assistant Examiner

U.S. Cl. X.R.

235—151.34; 137—551